United States Patent [19]

Kolb

[11] Patent Number: 4,958,882
[45] Date of Patent: Sep. 25, 1990

[54] FOLDING TOP FOR VEHICLES

[75] Inventor: Eugen Kolb, Stuttgart, Fed. Rep. of Germany

[73] Assignee: Dr. Ing. h.c.F. Porsche Aktiengesellschaft, Weissach, Fed. Rep. of Germany

[21] Appl. No.: 387,526

[22] Filed: Jul. 31, 1989

[30] Foreign Application Priority Data

Jul. 29, 1988 [DE] Fed. Rep. of Germany ....... 3825790

[51] Int. Cl.⁵ .............................................. B60J 7/12
[52] U.S. Cl. ..................................... 296/108; 296/117
[58] Field of Search ............. 296/107, 108, 116, 117 X

[56] References Cited

U.S. PATENT DOCUMENTS

| | | | |
|---|---|---|---|
| 3,323,830 | 6/1967 | Husko et al. | 296/116 |
| 3,473,842 | 10/1969 | Bracey et al. | 296/116 |
| 4,487,447 | 12/1984 | Schröder | 296/108 |
| 4,573,732 | 3/1986 | Muscat | 296/108 |
| 4,828,317 | 5/1989 | Muscat | 296/107 |

FOREIGN PATENT DOCUMENTS 706684 4/1941 Fed. Rep. of Germany .

Primary Examiner—Robert R. Song
Attorney, Agent, or Firm—Evenson, Wands, Edwards, Lenahan, McKeown

[57] ABSTRACT

So that when a folding top is closed, a good sealing is achieved with respect to an adjacent lateral viewing window and the folding top can be stored without any problems in a rear side accommodating space of an aerodynamically optimized vehicle body, a rear edge of the viewing window, which extends approximately upright, interacts, in a sealing manner, with a pillar section which is pivotally connected with the rear folding top frame. The pillar section, by means of a connecting member, is connected to a control lever. During the swivelling-back of the folding top, a free end of the pillar section carries out a forced movement toward the inside.

12 Claims, 7 Drawing Sheets

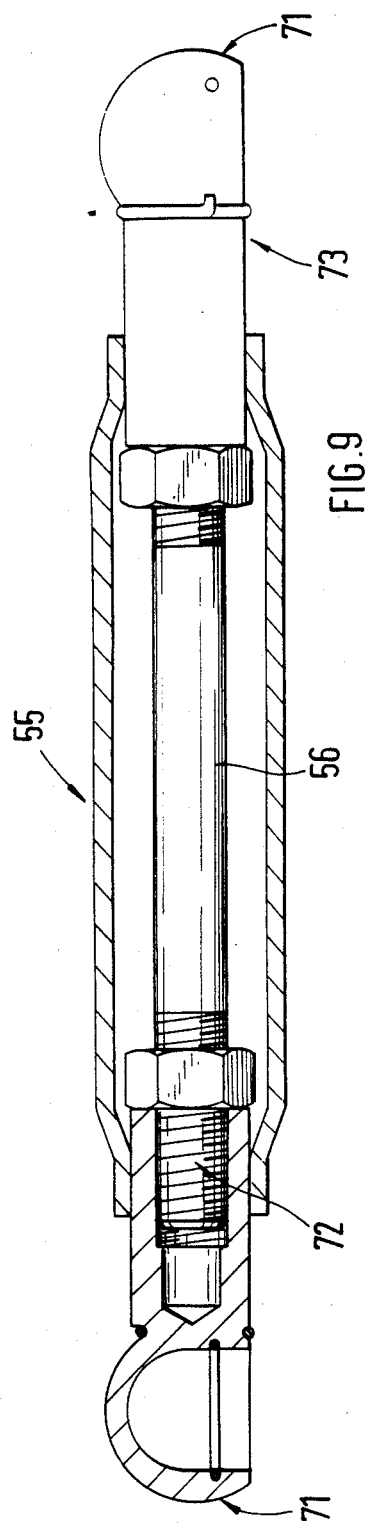
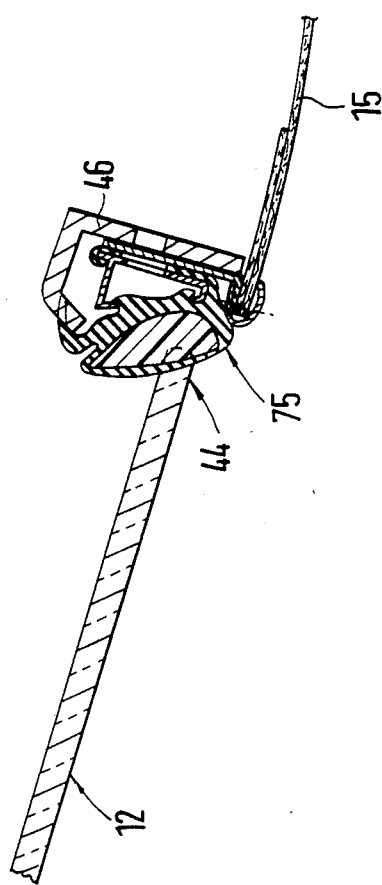
FIG.9
FIG.10

FOLDING TOP FOR VEHICLES

BACKGROUND AND SUMMARY OF THE INVENTION

The present invention generally relates to a folding top for vehicles, particularly passenger cars, and more particularly to a folding top having a reduced lateral dimension when folded.

A folding top for passenger cars is disclosed by German Patent Specification (DE-PS) 706,864. In such a folding top, which is typical, all rotational axes of the kinematics of the top extend in the same direction and vertically with respect to the vertical longitudinal center plane of the passenger car. In order to house this type of a folding top completely immersed in a rear-side accommodating space of the vehicle body, the rear area must have at least the same width as the largest width of the top.

Therefore, in new, aerodynamically optimized vehicle bodies which are tapered in the rear, considerable problems arise with respect to housing the top in an immersed position in an accommodating space at the rear side.

Accordingly, it is an object of the present invention to take such measures with respect to a folding top so that, when the top is closed, a good sealing is achieved on the circumferential side with the adjacent lateral window and that, even in the case of aerodynamically optimized vehicle bodies (tapering of the rear), the folding top can be accommodated without any problems in a completely immersed position in a rear-side accommodating space.

Main advantages achieved by preferred embodiments of the invention are that, by means of a pillar section provided in the rear upright edge area of a side window and connected with the folding top by way of a forced control, a good sealing of the window is achieved. Additionally, a reduction of the width of the folding top during the swivelling-back is achieved, since the free end of the pillar section is forced to carry out a movement toward the inside.

The decisive factor for this movement toward the inside is a diagonally extending rotating shaft between the rear top frame and the pillar section. The provision of ball joints for an associated connecting rod causes a good sequence of movements without any distortions of the kinematics of the folding top. When the folding top is closed, the connecting rod fixes the pillar section in longitudinal direction of the vehicle.

In this construction, the window and the folding top may have a considerable lateral drop (diagonal position), and the folding top can nevertheless without any problems, and without any cost-intensive changing of the rear, be housed in an accommodating space at the rear.

Other objects, advantages and novel features of the present invention will become apparent from the following detailed description of the invention when considered in conjunction with the accompanying drawings.

BRIEF DESCRIPTION OF THE DRAWINGS

FIG. 9 is a sectional view according to line IX—IX of FIG. 7;

FIG. 10 is a sectional view according to line X—X of FIG. 7.

DETAILED DESCRIPTION OF THE DRAWINGS

Figure 1:
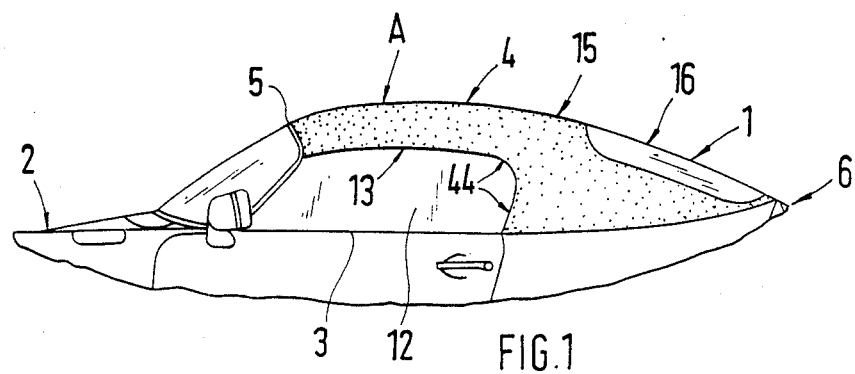
FIG. 1, is a partial lateral view of a passenger car having a folding top which is in the closed position.

An embodiment of the invention is shown in the drawing and will be explained in detail in the following.

FIG. 1 shows a convertible two-seat passenger car 1, the body 2 of which, above a belt line 3, comprises a folding top 4 which extends between a windshield frame 5 and a rear area 6. In its closed position A, the folding top 4, by means of clamps which are not shown in detail, is held in position at the windshield frame 5. After the release of the clamps, the folding top 4 can be swivelled behind the two front seats 7.

Figure 2:
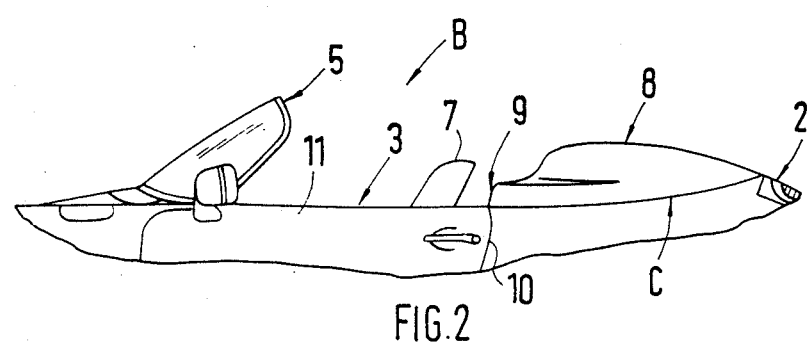
FIG. 2 is a partial lateral view of the passenger car with a swivelled back folding top.
Figure 3:
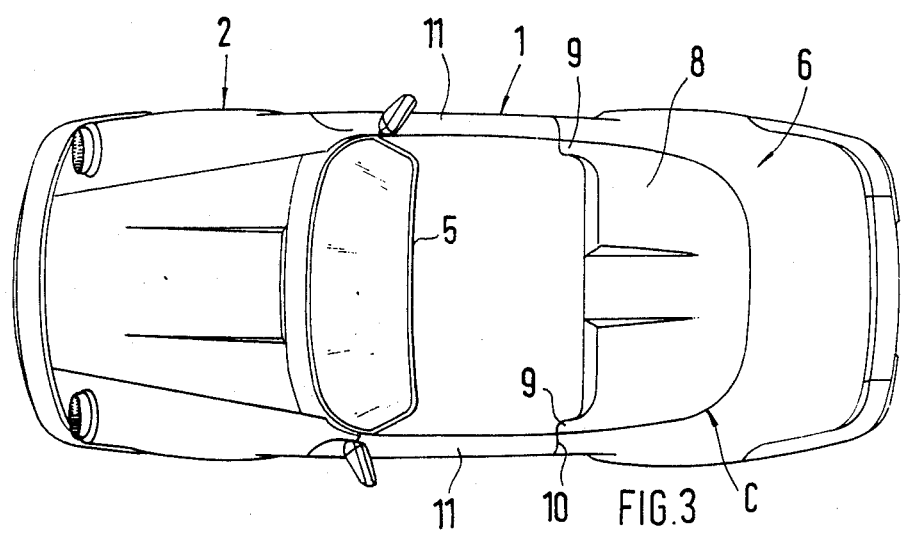
FIG. 3 is a top view of FIG. 2.

According to FIG. 2, the folded-back top 4 (open position B) is arranged underneath a rear cover 8 made of plastic, the rear cover 8 being pivotable at the body 2. In top view, the aerodynamically constructed rear cover 8 is adapted to the curved course C of the rear contour. Front end areas 9 of the rear cover 8, which are located laterally toward the outside, extend approximately as a continuation of a rear boundary edge 10 or a side door 11.

The door 11 is provided with a vertically adjustable window 12, this viewing window 12 being guided without any frame above the belt line 3. An upper, approximately horizontally extending edge 13 of the viewing window 12, when the folding top A is closed, supports itself under prestress at a sealing device mounted at the folding top 4 and not shown in detail.

Figure 4:
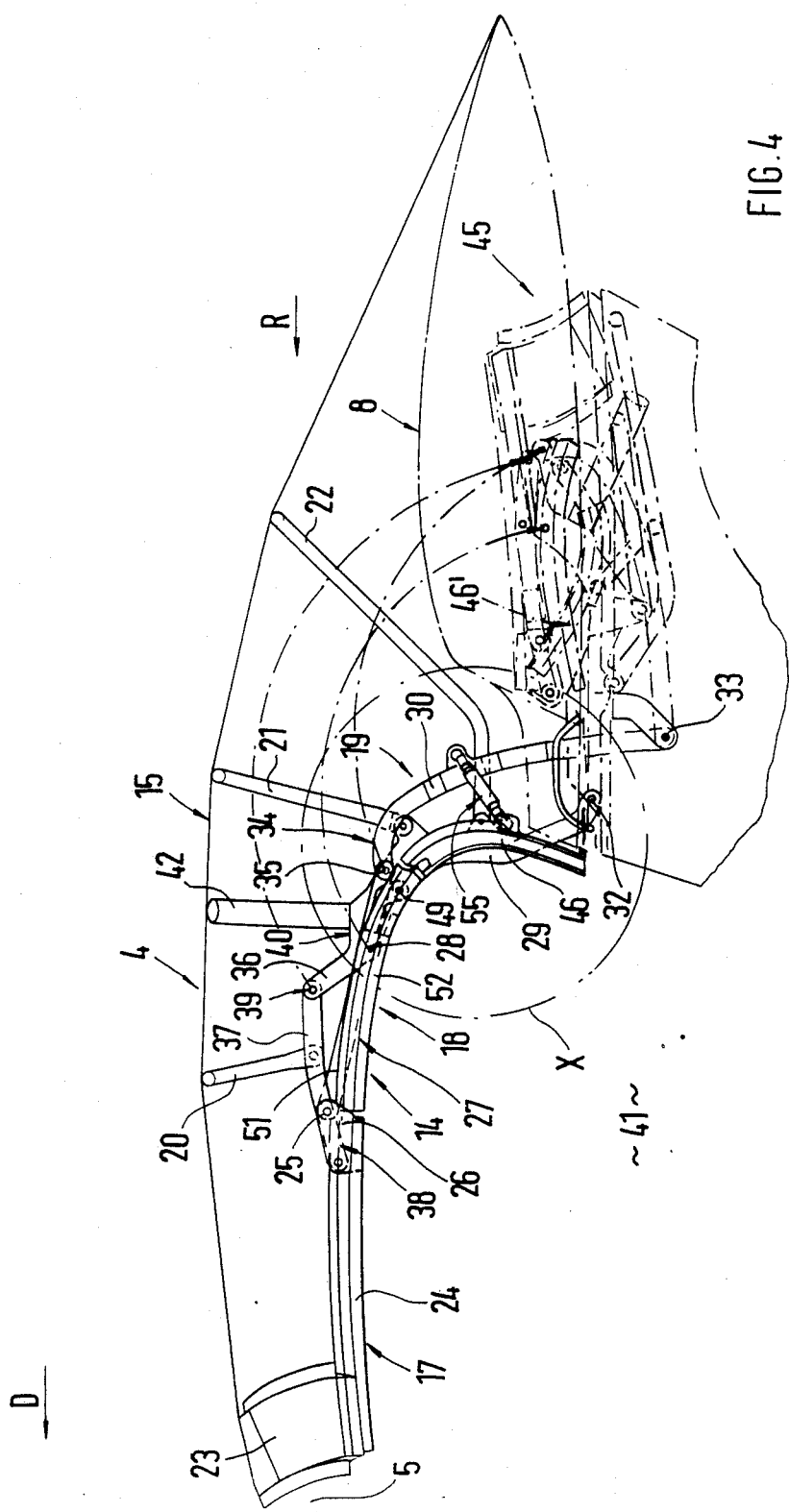
FIG. 4 is an enlarged partial lateral view of the folding top linkage.

The folding top 4 includes a folding top structure 14 and a folding top covering 15 as seen in FIG. 4, adjacent to the rear area 6, a flexible or rigid rear viewing window 16 being provided as seen i FIG. 1. The folding top structure 14 comprises a front folding top frame 17, a rear folding top frame 18, a parallelogram linkage 19 engaging at the rear folding top frame 18, a transverse front bow 20, a transverse rear bow 21 and a corner bow 22 (FIG. 4).

The front folding top frame 17 includes a transverse member 23 extending adjacent to the windshield frame 5 and two lateral front longitudinal members 24, the two longitudinal members 24, at their front end areas, being fixedly connected with the transverse member 23. The rear folding top frame 18 comprises two rear longitudinal members 27 located laterally on the outside, each longitudinal member 27 having a longitudinal control arm 51 disposed on the inside and a holding part 52 disposed on the outside. A seal is fastened at the holding Part 52 which is not shown in detail and which interacts with the viewing window 12 in a sealing fashion. The holding part 52 locally is fixedly connected with the longitudinal control arm 51, for example, by means of welding. Corresponding to FIG. 4, the-holding part 52 is adapted to the curved course of the shape of the top edge 13 of the viewing window 12, while the longitudinal control arm 51 has a straight construction.

According to FIG. 4, the front folding top frame 17, at reference number 25, is hinged to the rear folding top frame 18, the hinge shaft 25 being aligned horizontally and extending in transverse direction of the vehicle. The hinge shaft 25 connects a bearing 26 provided at the longitudinal member 24 with the longitudinal control arm 51.

Figure 7:
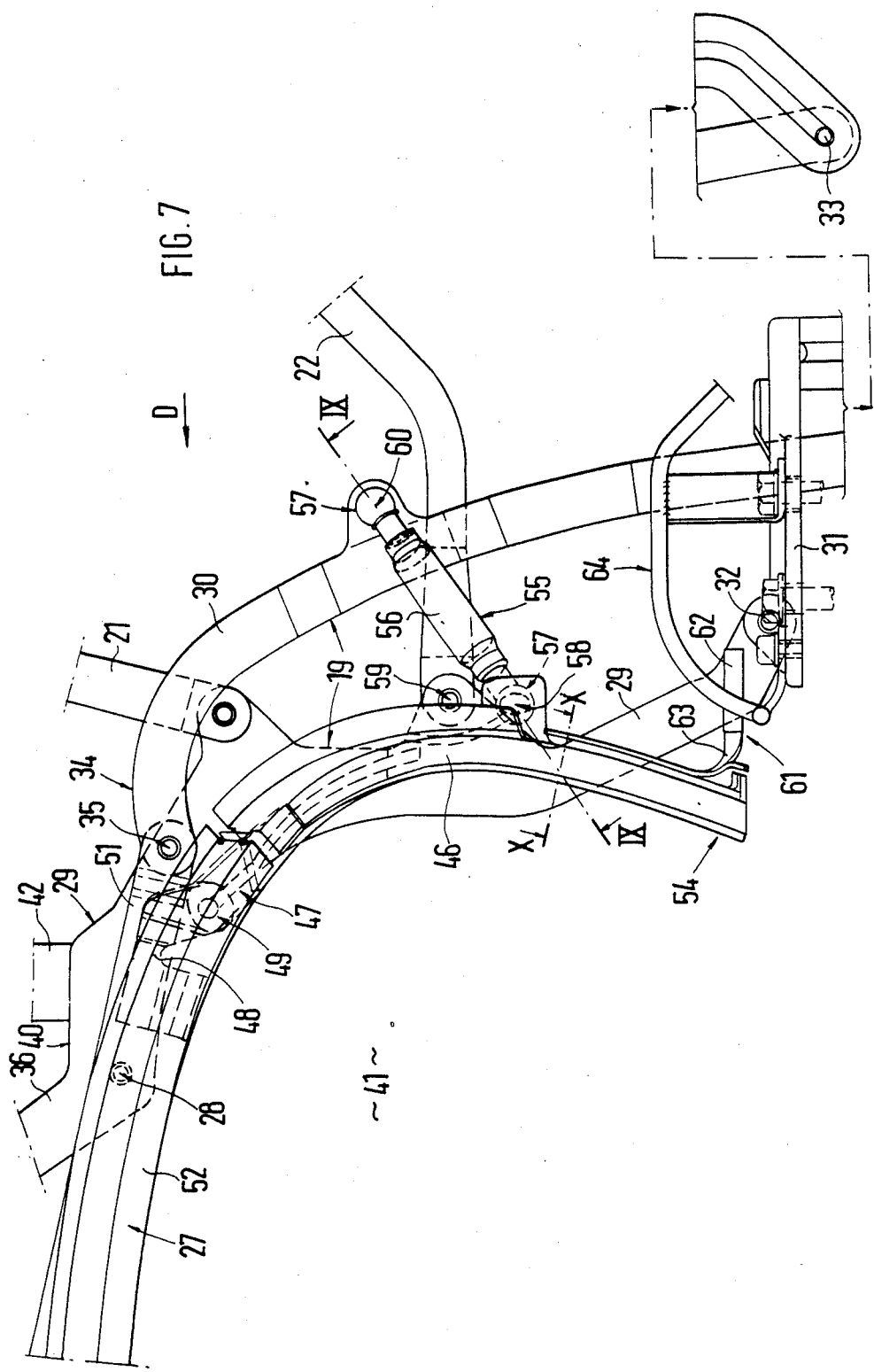
FIG. 7 is an enlarged detail X of FIG. 4.

Each longitudinal control arm 51, in a central area of its longitudinal course, is rotatably connected with a main bow 29 by a rotating shaft 28. The rotating shaft 28 of the main bow 29 is aligned horizontally and extends in transverse direction of the vehicle. The main bow 29 and a control lever 30 located behind it as viewed in a forward driving direction D, form the parallelogram linkage 19 (FIG. 7). The main bow 29 and the control lever 30 are pivoted at a bearing plate 31 fastened on the body side as best seen in FIG. 7 by rotating shafts 32, 33 respectively. Both rotating shafts 32, 33 are aligned horizontally and extend in a transverse direction of the vehicle. In this case, the rotating shaft 33 of the control lever 30 is disposed lower than the rotating shaft 32 of the main bow 29, specifically below the bearing plate 31. Viewed in driving direction D, the rotating shaft 32 is disposed in front of the shaft 33.

Figure 5:
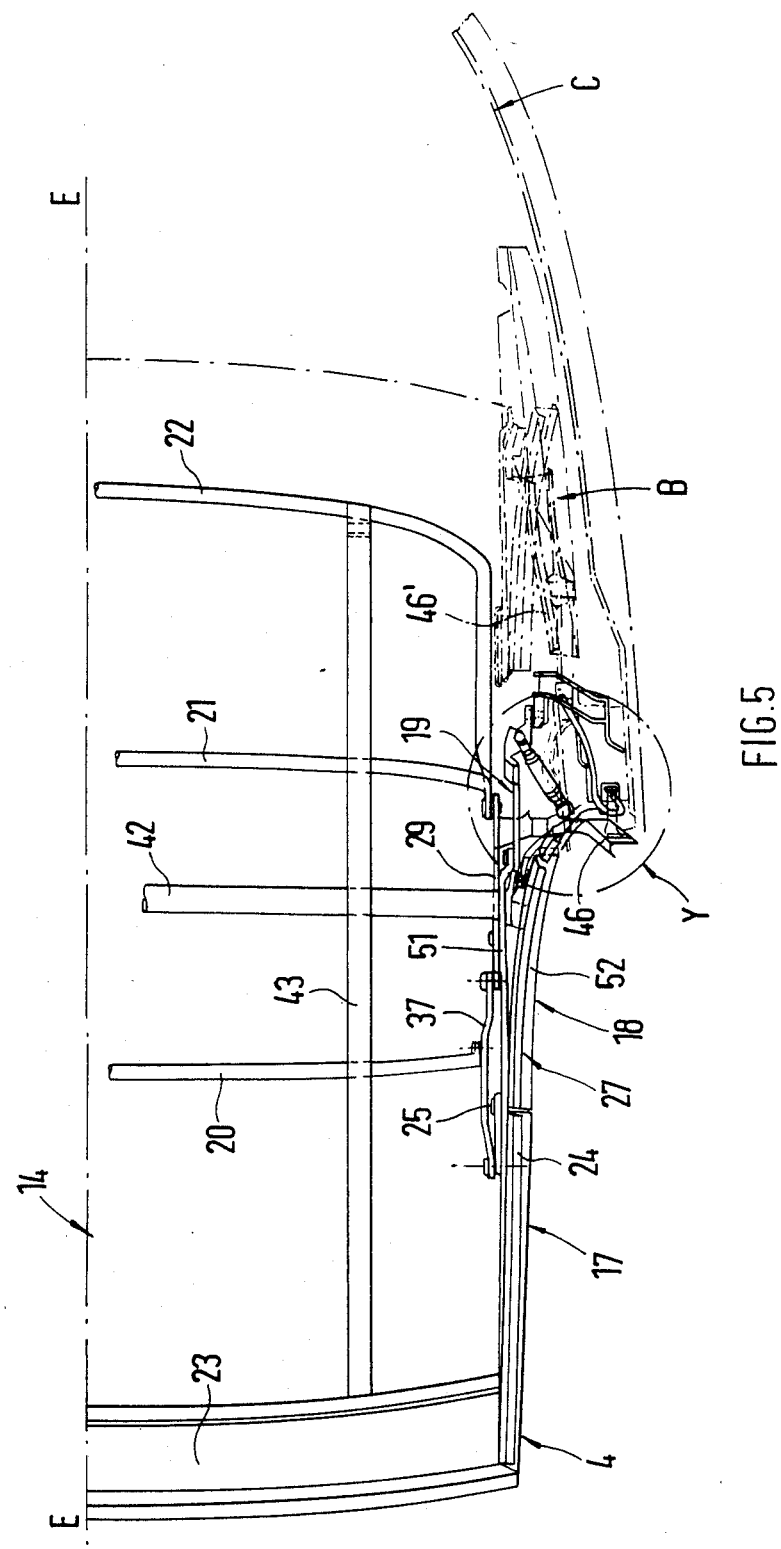
FIG. 5 is an enlarged partial top view of FIG. 4.

An upper end of the control lever 30, at reference number 35, is pivotally connected with the rear end of the longitudinal arm 51. An arm 36 of the main bow 29 located above center of rotation of shaft 28 is pivoted about linking point or pivot axis 39 with a lever 37, one portion of which is pivoted at the bearing 26 of the member 24. The other linking point 39 of the lever 37, in driving direction D, is located in front of the ax of rotation of shaft 28. In a central area of its longitudinal course, the front transverse bow 20 is pivotally to the lever 37 which rises diagonally in upward direction. The main bow 29, adjacent to the axis of rotation of shaft 28, has an approximately horizontally aligned section 40, from a tube-shaped hoop 42 leads away which spans the compartment 41. The hoop 42 is fixedly connected wit 40, for example, by means of welding. In addition, th transverse bow 21 and the corner bow 22 are pivotally to the main bow 29. The transverse bows 20, 21, the bow 22 and the hoop 42 are connected with one another means of longitudinally extending catch bands 43 (FIG. 5).

Figure 8:
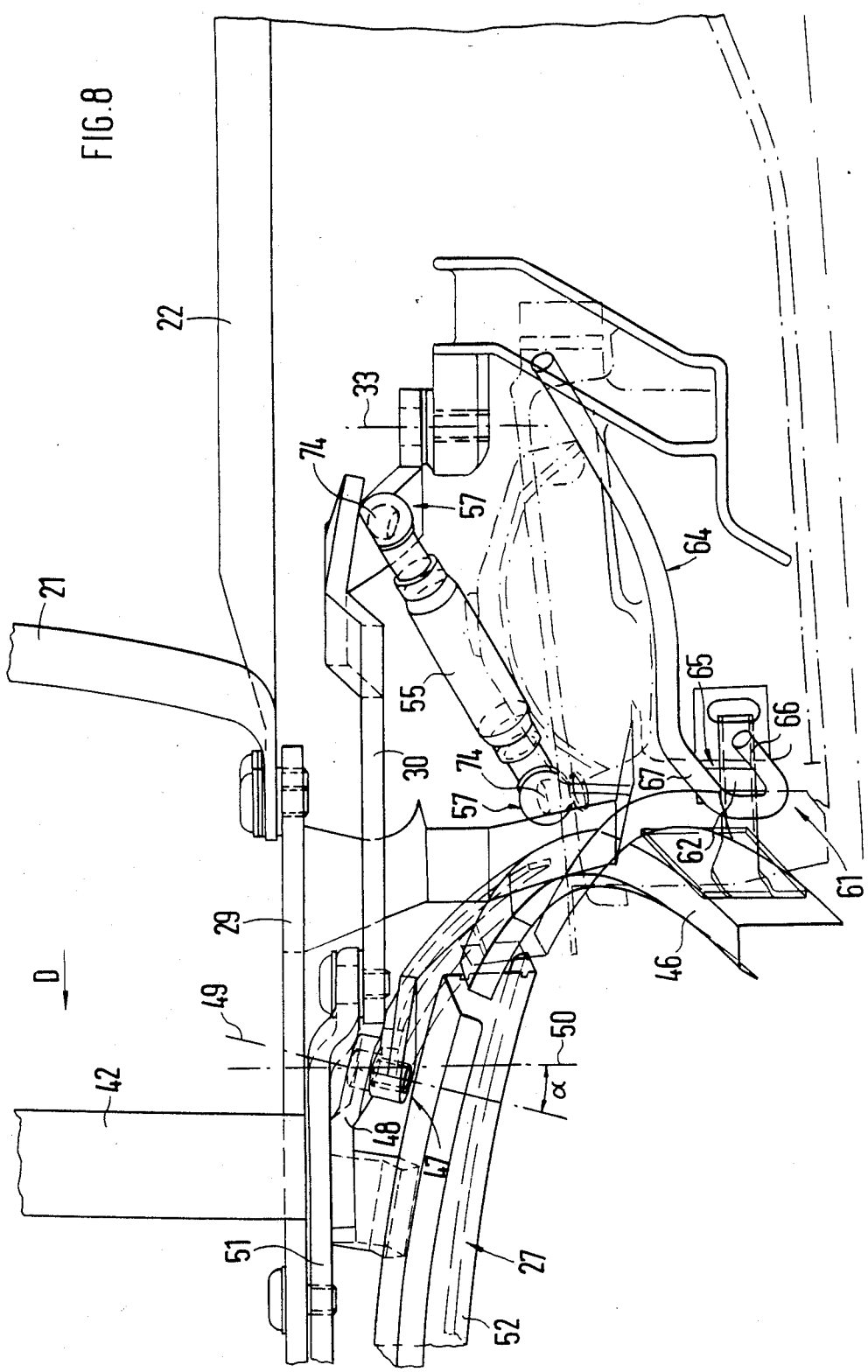
FIG. 8 is an enlarged detail Y of FIG. 5.

So that a rear, approximately upright extending edge 44 of the viewing wind 12 is properly sealed when the folding top 4 is closed, and folding top 4 can be housed in an accommodating s 45 on the body side without changing the rear area 6 in a car which, for aerodynamic reasons, has a tapered a pillar section 46 is provided adjacent to the edge 44 in lateral view, extends approximately in parallel to the contour of the viewing window 12. At its upper end 47 as seen in FIG. 7, the pillar section 46 is rotatably connected with angle 48 mounted at the rear longitudinal 27. The rotating shaft 49 of the pillar section 46 below the rotating shaft 35 and, viewed in the forward driving direction D, in front of the shaft 35. In addition, the rotating shaft 49 as seen in the top view of FIG. 8, an acute angle α with respect to a vertical auxiliary plane 50 extending transversely to the longitudinal axis of the vehicle in such a manner that an exterior area o rotating shaft 49, viewed in driving direction D, is farther in front than an interior area of the rotation 49 (FIG. 8). Viewed in the vertical direction, the contact surface of the pillar section 46 and the holding 48 may either be aligned vertically or be slightly sloped. The upper end 47 of the pillar section 46 is overlapped in by the holding part 52 of the longitudinal 27 (lateral view).

As a result the diagonally extending rotating shaft 49; the bottom free 54, of the pillar section 46, when the folding top 4 i back, carries out a movement toward the inside so the pillar section 46 is moved toward the inside into the space 45 without any change of the configuration of the rear area 6. The swivelled-back position of the folding top 4 is shown in FIG. 4 by a dash-dotted 1 In addition, the pillar section 46, in a central area of its vertical course, is connected to the control lever 3 . means of a connecting member 55. The connecting member 55 is constructed as a rod 56, the two ends of which, by means of ball-and-socket joints 57, on one side are connected the control lever 30 and, on the other side, with the pill ion 46. The linking point 58, on the pillar side, is approximately below the liking point 59 of the corner 22. When the folding top 4 is closed, the rod 56—as against the driving direction D—extends diagonally in a direction. The end 60 of the rod 56 on the side of the lever 30 is provided above the linking point 59 of the bow 22.

When the folding top 4 is closed, the bottom free end 54 of the pillar 46 interacts with a locking device 61, as seen in FIGS. 8, in such a manner that the pillar section 46 is fixed in the transverse direction of the vehicle. The device 61 is formed by a longitudinally directed pin 62 when the folding top 4 is closed, is aligned horizontally. The pin 62 is molded onto an angular fi 63 which is fastened to the pillar section 46 by means of such as screws. Viewed i driving direction D, the pin 62 extends away from the pillar section 46 toward the rear According FIGS. 7 and 8, the pin interacts with a bow-shaped guiding member 64 arranged on the body side. The guiding member as seen in the top view provided by FIG. 8, has a U-shaped end area 65, two tube-shaped legs 66, 67 extending against the driving direction D diagonally in an upward direction. The leg 67 facing the longitudinal center plane E—E of the has a longer length then leg 66 and, in sections, a shape. During the closing of the folding top 4, the pin 62 interacts with the longer leg 67 in such a manner that the end 54 of the pillar section 46 is moved toward the outs At both its ends, the guiding member 64 is fixedly screwed the bearing plate 31 and extend, with the exception of the points, essentially above the bearing plate 31 According to FIG. 8, the guiding member 64, with its lo leg 67, extends approximately along the length of the bearing plate 31. When the folding top 4 is closed, the Pin 2 is arranged between the two legs 66, 67 of the U-shaped end 65 of the guiding member 64 which are directed in the direction. For the purpose of reducing noise, the pin is provided with an enclosure of plastic or rubber which is shown in detail.

Figure 6:
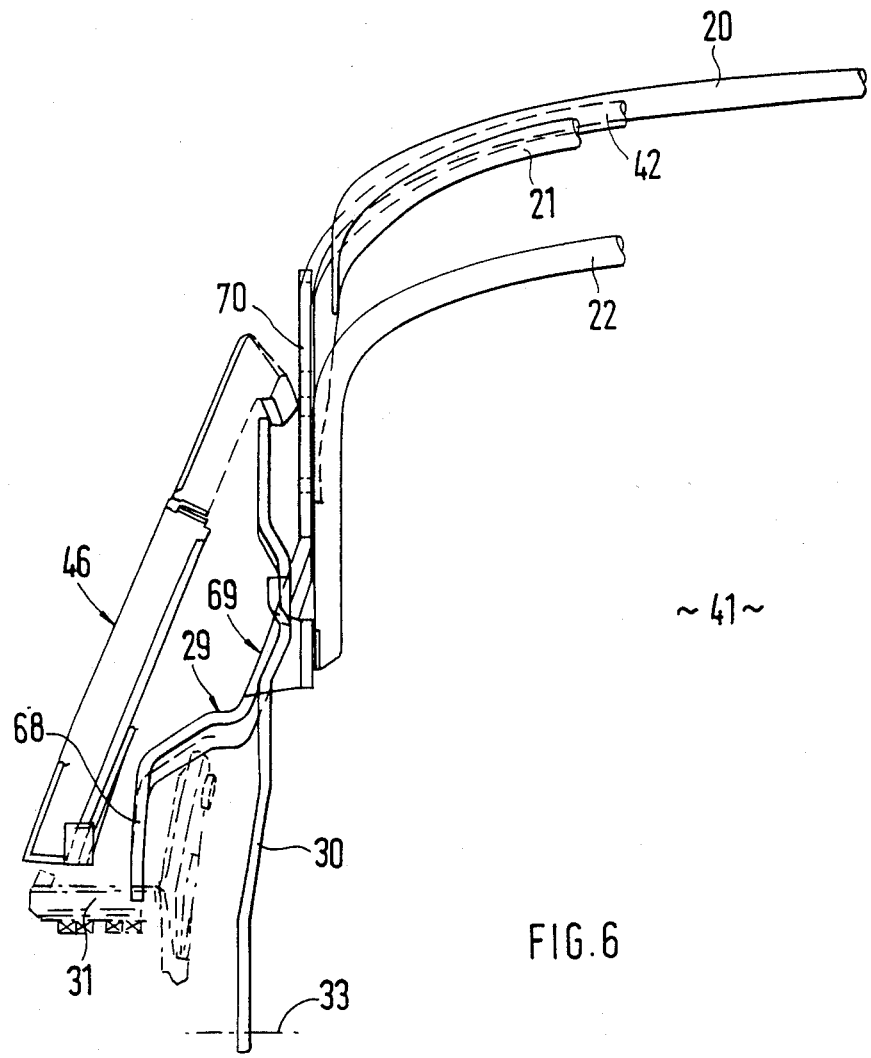
FIG. 6 is an enlarged view in the direction of arrow R of FIG. 4.

The main 29, as seen in the lateral view afforded by FIG. 6, extends at a distance from the contour of the pillar section 46. The lower, approximately upright section 68 of the main bow 29, by of a diagonally extending projection 69, is connected wi upper upright section 70 of the main bow 29 which is arranged farther on the inside.

The ball-and socket joints 57 for the rod 56 are formed by ball sockets 71 are adjustably screwed onto the ends 72, 73 of the rod 5 The ball sockets 71 are pressed on ball heads 74 which are mounted at the control lever 30 and at the pillar section 46. The pillar section 46 is preferably constructed as a die cast aluminum part, and, in cross-sectional view, has an approximately L-shaped profile.

The folding top covering 15 is fixed laterally at the front folding top frame 17 and at a lower area of the pillar section 46, whereas it rests against the rear folding top frame 18 without being fastened.

FIG. 10 shows how a sealing body 75 interacting with the rear edge 44 of the viewing window 12 is fastened at the pillar section 46. In the folded-back position B of the folding top, the pillar section 46 has the reference number 46 (FIG. 4 and 5).

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A folding top for vehicles, particularly passenger cars, having a front folding top frame and a rear folding top frame and a parallelogram linkage which engages at the rear folding top frame, the parallelogram linkage comprising a main bow and a control lever which are both pivotally connected to a vehicle body, a frameless viewing window extending adjacent to the rear folding top frame, wherein a rear, approximately upright extending edge of the viewing window, in a sealing manner, is in operative connection with a pillar section which is connected with the rear folding top frame by means of a diagonally extending rotating shaft, and wherein the pillar section interacts flexibly, by means of a connecting member, with the control lever in such a manner that, during a swivelling-back of the folding top, a free end of the pillar section carries out a forcibly controlled movement toward an inside of the vehicle body.

2. A folding top according to claim 1, wherein an upper end of the pillar section is hinged to the rear folding top frame.

3. A folding top according to claim 2, wherein a longitudinal member of the rear folding top frame has an interior longitudinal control arm and an exterior holding part.

4. A folding top according to claim 1, wherein a rear area of the folding top frame overlaps an upper end of the pillar section in sections.

5. A folding top according to claim 1, wherein a bottom free end of the pillar section, when the folding top is closed, interacts with a locking means which operates in a transverse direction of the vehicle.

6. A folding top according to claim 1, wherein a rotating shaft extends between the pillar section and a longitudinal control arm of the rear folding top frame at an angle ($\alpha$) with respect to a vertical auxiliary plane in such a manner that an exterior section of the rotating shaft, viewed in a forward driving direction of the vehicle, is located farther to the front that an interior section of the rotating shaft.

7. A folding top according to claim 1, wherein the connecting member is formed by a rod, two ends of which, by means of ball and socket joints, are connected to the control lever and the pillar section respectively.

8. A folding top according to claim 7, wherein the rod, when the folding top is closed, viewed against the forward driving direction of the vehicle, extends diagonally upward and wherein the end of the rod, on a side or the pillar, is arranged in a central area of a vertical course of the pillar section.

9. A folding top according to claim 5, wherein the locking means is formed by a longitudinally directed pin fastened at the pillar section, this Pin being in operative connection with a bow-shaped guiding member arranged on a vehicle body side.

10. A folding top according to claim 9, wherein the guiding member is arranged essentially above a bearing plate on the vehicle body side.

11. A folding top according to claim 9, wherein the guiding member is arranged essentially on a side of the pin facing a longitudinal center plane of the vehicle and has a curved shape.

12. A folding top according to claim 9, wherein, when the folding top is closed, the pin extends between two legs of a U-shaped end area of the guiding member which point in a same direction.

* * * * *